United States Patent
Salant et al.

[11] Patent Number: 6,112,160
[45] Date of Patent: Aug. 29, 2000

[54] OPTICAL RECORDING MEASUREMENT PACKAGE

[75] Inventors: Lawrence S. Salant, New Hempstead, N.Y.; Peter J. Pupalaikis, Ramsey; Gerald Juskovic, Morristown, both of N.J.

[73] Assignee: LeCroy Corporation, Chestnut Ridge, N.Y.

[21] Appl. No.: 09/155,969

[22] PCT Filed: Apr. 9, 1997

[86] PCT No.: PCT/US97/05843

§ 371 Date: Aug. 30, 1999

§ 102(e) Date: Aug. 30, 1999

[87] PCT Pub. No.: WO97/38321

PCT Pub. Date: Oct. 16, 1997

Related U.S. Application Data

[60] Provisional application No. 60/014,936, Apr. 10, 1996.

[51] Int. Cl.[7] .................................................. H03K 5/00
[52] U.S. Cl. ............................................. 702/66; 702/69
[58] Field of Search ............................ 702/66, 69, 64, 702/65, 73

[56] References Cited

U.S. PATENT DOCUMENTS

| | | | |
|---|---|---|---|
| 3,665,169 | 5/1972 | Henderson et al. | 702/87 |
| 3,913,095 | 10/1975 | Dlugos | 377/22 |
| 4,047,007 | 9/1977 | Dlugos et al. | |

Primary Examiner—Thomas R. Peeso
Attorney, Agent, or Firm—Frommer Lawrence & Haug; William S. Frommer

[57] ABSTRACT

Optical recording measurement package provides methods and techniques for identifying and categorizing each feature (pittspace) within an optical recording data waveform and for buffering, analyzing and displaying in various ways data regarding the identified features. To identify or extract each feature in a supplied waveform, levels of the waveform are considered to be within one of three zones of which the middle (or second) zone represents an amount of required hysteresis of the waveform and which includes a threshold level. A state machine having a number of states is provided to record the true edges of the features of the optical recording data waveform.

49 Claims, 8 Drawing Sheets

FIG. 16

OPTICAL RECORDING MEASUREMENT PACKAGE

RELATED APPLICATION

This application claims the benefit of U.S. provisional application Ser. No. 60/014,936, filed Apr. 10, 1996.

BACKGROUND OF THE INVENTION

The present invention relates to optical recording measurement package and, more particularly, to methods for measuring, buffering, analyzing and displaying features in optically recorded data waveforms. currently, optical recording (OR) data waveforms are measured and tested using a combination of test instruments, including digital storage oscilloscopes (DSOs) and timing analyzers. While such test instruments provide valuable information to the user, their ability to analyze particular types of signals, e.g., OR data waveforms, are limited. Due to such limitations, these complex signals often are analyzed by human eye which provides opportunity for error and imprecision. Furthermore, human eye analysis generally cannot be automated. Thus, there is a need to provide an optical recording measurement package which addresses the measurement needs of, for example, manufacturers of CD-ROM and magnetic optical products.

OBJECTS OF THE INVENTION

Therefore, it is an object of the present invention to provide optical recording measurement package which overcome the shortcomings of the above-mentioned devices.

Another object of the present invention is to provide optical recording measurement package which is capable of analyzing OR data waveforms in a manner not previously possible.

A further object of the present invention is to provide various techniques for measuring and identifying the OR data (e.g., pits and spaces) represented by the OR data waveforms.

An additional object of this invention is to provide a technique for categorizing the OR data and displaying the categorized data to a user in a manner previously not possible by digital storage oscilloscopes.

Still another object of the present invention is to provide optical recording measurement package which analyzes OR data waveforms in a quick, efficient, unique and automatic manner.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, method is provided for determining when a waveform (i.e., a pulse-width modulated waveform) enters either a first zone or a third zone of a three zone band that has a second zone between the first and third zones and which includes a predetermined threshold level, the entered zone being identified as a designated zone, identifying after the waveform enters the designated zone that position of the waveform at which it crosses the predetermined threshold level as one of the feature edges of the waveform, then determining when the waveform enters the other zone (i.e., the first or third zone) that is not the designated zone, identifying the next position of the waveform at which it crosses the predetermined threshold level as another feature edge of the waveform, repeating the previous steps until the end of the waveform is reached, and then identifying each feature of the waveform from the identified features edges.

In accordance with another embodiment of the present invention, method is provided for identifying the first position of the waveform that has a level within either the first or third zone (designated the starting zone), identifying the next position of the waveform at which it crosses the predetermined threshold level as the beginning position of the first feature, then determining when the waveform enters the other zone (i.e., the first or third zone) that is not the starting zone, identifying the next position of the waveform at which it crosses the predetermined threshold level as the ending position of the first feature and the beginning position of the next feature, determining when the waveform again enters the starting zone, identifying the next position of the waveform at which it crosses the predetermined threshold level as the ending position of the feature and as the beginning position of another feature, and repeating the third through sixth steps until the end of the waveform is reached.

As one aspect of this embodiment of the present invention, the predetermined threshold level is at the midpoint of the second zone.

As another aspect, the waveform is an optical recording waveform that is reproduced from an optical recording-type record medium, and the first feature is identified as a pit when the first position of the waveform is within the first zone and as a space when the first position is within the third zone.

As a further aspect, when entry into the first zone is identified, the next feature is identified as a pit, and when entry into the third zone is identified, the next feature is identified as a space.

In accordance with a further embodiment of the present invention, method in the form of a state machine is provided for entering one of five possible states in accordance with the initial level of the waveform, which level may be within one of four different successive level regions, entering the second state when the waveform enters the first region and the state machine currently is in one of a first predetermined grouping of states, entering the third state when the waveform enters the fourth region and the state machine is in one of a second predetermined grouping of states, entering the fourth state when the waveform enters the third region and the state machine is in a particular one of the states, entering the fifth state when the waveform enters the second region and the state machine is in another particular state, storing the position of the waveform when the state machine enters the second state from the third state, enters the fourth state from the second state, enters the third state from the second state or enters the fifth state from the third state, and identifying each feature of the waveform from the stored positions of the waveform.

As one aspect of this embodiment of the present invention, the first state initially is entered when the waveform has an initial level within either the second or third regions, the second state initially is entered when the waveform has an initial level within the first region, and the third state initially is entered when the waveform has an initial level within the fourth region.

As another aspect of this embodiment, the first predetermined grouping of states includes the first, third and fifth states, the second predetermined grouping of states includes the first, second and fourth states, the particular state (to enter the fourth state) is the second state, and the other particular state (to enter the fifth state) is the third state.

As a further aspect of this embodiment, the current position of the waveform is identified as the beginning position of a pit when the state machine enters the fourth state from the second state or enters the third state from the second state, and the current position is identified as the beginning position of a space when the state machine enters the second state from the third state or enters the fifth state from the third state.

In accordance with still another embodiment of the present invention, method is provided for acquiring a waveform, extracting each feature in the waveform in accordance with a predetermined threshold level and a predetermined hysteresis level, each extracted feature including a starting position in the waveform and a polarity level, and storing the starting position and the polarity level of each extracted feature in a respective feature buffer.

As one aspect of this embodiment of the present invention, the polarity level of each feature identifies the respective feature as either a pit or a space.

As another aspect of this embodiment, the width and amplitude level of each extracted feature are identified and stored in the respective feature buffer.

As a further aspect of this embodiment, a clock waveform and a clock threshold level are received, threshold crossings of the clock waveform are qualified in accordance with the clock threshold level, and edges of the clock waveform are identified from the qualified threshold crossings.

As a feature of this aspect, the time differences between the leading\trailing edges of each feature and the nearest positive\negative clock edges thereof are calculated, and the calculated time differences for each feature are stored in the respective feature buffer. To determine the exact time at a given level, linear interpolation (or another interpolation technique) between the nearest sample values are used.

As yet another aspect of this embodiment, each of the extracted features is categorized into one of a plurality of category groups corresponding to a respective integer multiple of a known clock period, and the categorization of each feature is stored in the respective feature buffer.

In accordance with still a further embodiment of the present invention, method is provided for extracting each feature in the waveform in accordance with a predetermined threshold level and a predetermined hysteresis level, and categorizing each extracted feature into one of a plurality of category groups.

As one aspect of this embodiment, the ideal width (i.e., an integer multiple of a known clock period) to which the width of a respective feature is closest is ascertained, and the respective feature is categorized into the category group that corresponds to the ascertained ideal width.

As another aspect of this embodiment, the integer value n of a respective feature that satisfies the equation $(n-0.5)T \leq w < (n+0.5)T$ is ascertained, wherein w represents the width of the respective feature, T represents the known clock period, and the ascertained integer value n corresponds to the particular category group to which the respective feature is categorized.

As a further aspect of this embodiment, the polarity of each feature is identified, and each feature is categorized also by its polarity.

As yet another aspect of this embodiment, the data type to be displayed within a desired category group is ascertained, data pertaining to each feature categorized into the desired category group are processed to derive categorization data, and the categorization data pertaining to the desired category group is displayed.

As yet a further aspect of this embodiment, each extracted feature is categorized by its polarity and its assigned category group, and data pertaining to each feature that is categorized into the desired category group and having a desired polarity is processed.

Still yet another aspect of this embodiment, the data type to be displayed for a desired plurality of category groups is identified, data pertaining to each feature that is categorized into any one of the desired category groups is processed to derive the categorization data, and the categorization data is displayed.

Still yet a further aspect of this embodiment, the data type to be displayed for desired discrete category groups is identified, data pertaining to each feature that is categorized into each discrete category group is processed separately by category group to derive respective categorization data, and the respective categorization data are displayed simultaneously.

In accordance with still yet another embodiment of the present invention, method is provided for identifying a type of data that is necessary to produce a desired data regarding at least one feature of an optical recording waveform, identifying one of a plurality of functions that provide the type of data, each of the plurality of functions deriving respective feature data from respective dependent data, determining if at least one of the dependent data of the identified function is the feature data that is derived by another function, performing the other function if the dependent data of the identified function is indeed derived by another function and if that other function was not performed previously, then performing the identified function if it was not performed previously so as to derive the respective feature data, and producing the desired data from the derived respective feature data of the identified function.

As one aspect of this embodiment, one function is an extract function which derives position information of each feature of the optical recording waveform from the optical recording waveform, a threshold level and a hysteresis level.

As a feature of this aspect, another function is an amplitude function which derives amplitude information of each feature from the optical recording waveform and from the position information that is derived from the extract function.

As another feature of this aspect, another function is a clock function which derives clock edge information of each feature from the position information that is derived from the extract function and from a clock waveform.

As yet a further feature of this aspect, another function is a categorize function that derives a category grouping of each feature from the position information that is derived from the extract function and from a known clock period.

As another aspect of this embodiment, the identified function is carried out if it was not performed previously or if its respective dependent data was modified after it was performed previously.

As a further aspect of this embodiment, the other function is performed if it was not performed previously or if its dependent data was modified after it was performed.

As yet another aspect of this embodiment, the type of data necessary to produce desired statistical data regarding a selected category grouping of the features is identified, a categorize function which derives the category grouping of each feature is performed, and the desired statistical data is produced from the data of only those features having the selected category grouping.

In accordance with still yet a further embodiment of the present invention, method is provided for receiving a waveform representing optically recorded data, identifying the most often occurring level of a feature of the waveform as a most likely level, and producing the base\top of the feature from those levels of the feature at or exceeding the most likely level.

As one aspect of this embodiment, all of the levels of the feature are histogrammed, the most intensely populated region of the histogram is identified, and that level of the histogram that corresponds to the most intensely populated region is ascertained to be the most likely level.

As another aspect of this embodiment, all of the levels of the feature that have a magnitude at or above the magnitude of the most likely level are averaged to produce the base\top value.

BRIEF DESCRIPTION OF THE DRAWINGS

The following detailed description, given by way of example and not intended to limit the present invention solely thereto will best be appreciated in conjunction with the accompanying drawings, wherein like reference numerals denote like elements and parts, in which.

DETAILED DESCRIPTION OF CERTAIN PREFERRED EMBODIMENTS

The optical recording measurement package provides a set of waveform measurements and mathematical functions for the analysis of optical recording (OR) signals. As will be discussed, OR data may be categorized, analyzed and displayed in a variety of ways. Specifically, the optical recording measurement package includes methods and techniques for extracting (identifying) "features" in the OR data waveform, buffering (storing) data related to the extracted features, categorizing the features by multiples of the clock period and polarity, performing calculations via a dependency based or so-called "on-demand" system, buffering statistics related to the extracted features, displaying data in a "List by nT" mode, and calculating the "base" and "top" of extracted features.

Figure 1A:
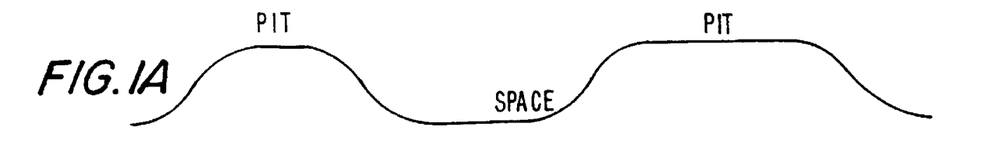
FIGS. 1A–1D schematically illustrate an optical recording data waveform.
Figure 1B:
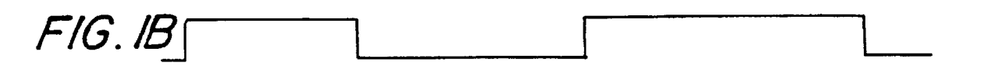
Figure 1C:
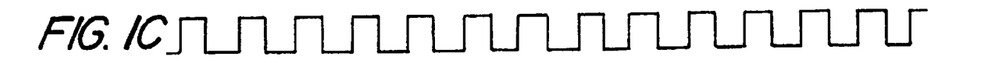
Figure 1D:
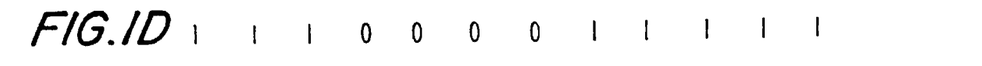

OR waveforms include a data waveform and a clock waveform. The data waveform contains the optically recorded data which is encoded as positive and negative polarity pits/spaces which vary ideally as an integer multiple of a known clock period. The clock waveform generally is extracted from the data waveform using a phase-lock loop (PLL) or similar mechanism and is used to sample the data waveform. Ideally, the clock has a single known period (T). FIG. 1A of the drawings illustrates an OR waveform having a "pit" (also called "mark"), followed by a "space" and another pit. FIG. 1B is an ideal pulse-width modulated waveform corresponding to the OR waveform of FIG. 1A. FIG. 1C represents the clock waveform having a period T and which is used to sample the OR data waveform to extract the data therefrom. For example, the first pit shown in FIG. 1A has a width equal to 3T (i.e., 3 periods of the clock) and represents the digital data "111", such as shown in FIG. 1D. The space of FIG. 1A has a width of 4T thus representing the digital data "0000", and the second pit of FIG. 1A has a width of 5T thus representing the digital data "11111". Typically, OR data waveforms include pits and spaces having widths between 3T and 11T, although pit/space widths from 1T to 25T (or even higher) are possible.

Figure 2:
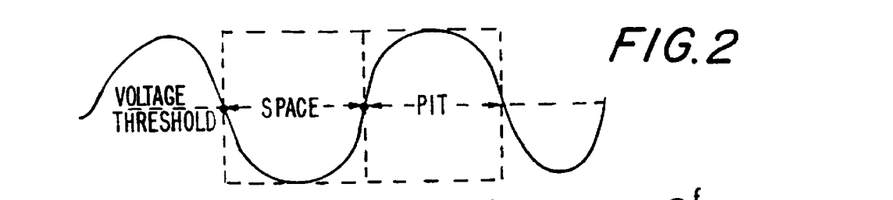
FIG. 2 is a schematic illustration of an OR data waveform including a space and a pit.

Generally, a voltage threshold is used to identify the pits and the spaces, each pit representing that portion of the OR data waveform above the voltage threshold and each space representing that portion of the waveform below the voltage threshold, such as shown in FIG. 2.

"Features" of the Optical Recording Data Waveform

The optical recording measurement package of the present invention identifies each pit and each space utilizing threshold crossings, hysteresis and edge polarity of threshold crossings. Each portion of the data waveform between "qualified" threshold crossings (to be discussed) identifies each pit or space, and each identified pit and each identified space are generically identified herein as a "feature" of the waveform. That is, a feature of the data waveform represents either a pit or a space.

Figure 3:
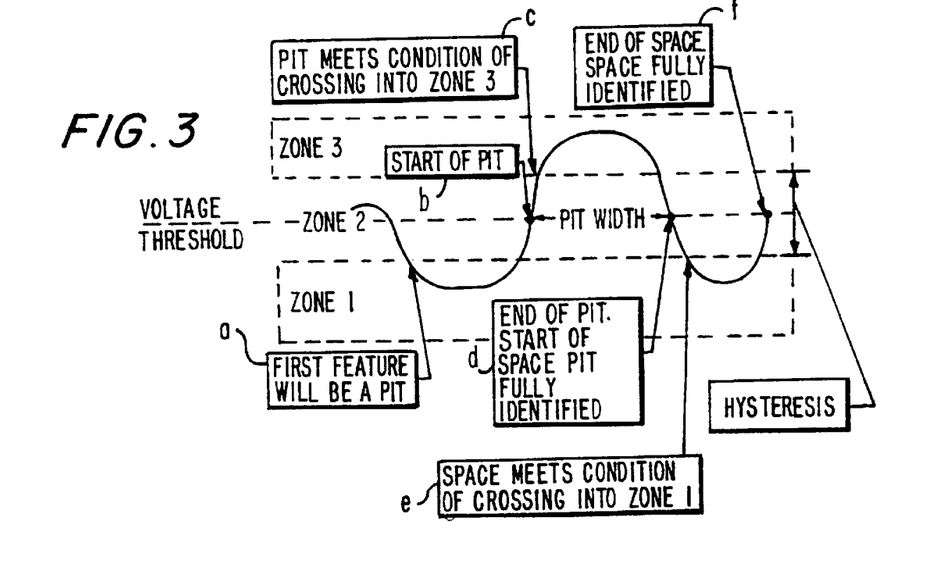
FIG. 3 is a schematic illustration of an OR data waveform having a hysteresis band in accordance with the present invention.

Referring to FIG. 3, the optical recording measurement package separates the voltage level range of the waveform into a hysteresis band having three zones: zone 1, zone 2 and zone 3. Zone 2 is a middle zone in which the above-mentioned voltage threshold is included. In a preferred embodiment of the present invention, the voltage threshold is at the mid-point of zone 2 and the width (i.e., voltage range) of zone 2 represents the amount of "hysteresis" such that each portion of zone 2 above and below the voltage threshold has a voltage range equal to half the hysteresis level. As shown, zone 1 represents the voltage levels below zone 2, and zone 3 represents the voltage levels above zone 2. Thus, a particular data point (i.e., data sample) of the OR waveform having a value (voltage level) P that is greater than the sum of the threshold level and half the hysteresis level is in zone 3, and a data point having a value P that is less than the threshold level reduced by half the hysteresis level is in zone 1.

As will be discussed, zones 1, 2 and 3 represent a hysteresis band in which both the voltage threshold crossings and the zone crossings are used to identify the pits and spaces in the OR waveform. Referring to the waveform in FIG. 3, given an initial waveform state (i.e., a first sample value) that is within the voltage range of zone 2, the first feature is not "identified" until the waveform crosses into either zone 1 or zone 3. When the exemplary waveform crosses from zone 2 to zone 1, as represented by reference "a", the first feature is "identified" as a pit, although the starting and ending boundaries of that first feature (pit) are not yet identified. While not shown, if the first zone crossing was from zone 2 to zone 3, the first feature would be identified as a space, and again, the starting and ending boundaries of the space would not yet be identified.

Once the feature is identified, that is, once the initial condition of having the waveform be within zone 1 or zone 3 is satisfied, the starting point of the feature (in the example, pit) is identified at the point the waveform crosses the voltage threshold, as represented by reference "b" in the figure. Once the voltage threshold is crossed (after the feature is "identified"), a so-called "first" condition that the waveform enter zone 3 must be met before the end point of the feature (pit) can be identified at the subsequent voltage threshold crossing. That is, if the first feature to be identified is a pit, the waveform must cross into zone 3, as represented by reference "c", before its end point can be identified. If, for example, the waveform crossed the voltage threshold (after crossing the voltage threshold at reference "b") without entering zone 3, the end of the pit would not be identified at reference "d" (i.e., at the voltage threshold crossing). However, once the waveform crosses into zone 3, the end point of the feature is identified at the next subsequent point the waveform crosses the voltage threshold, as represented by reference "d".

From the foregoing discussion, it is seen that four conditions must be satisfied to fully identify the first feature as a pit: (1) zone 1 is entered (either initially or from zone 2) before zone 3 is entered; (2) the voltage threshold is crossed; (3) zone 3 is entered; and (4) the voltage threshold is again crossed. The width of the identified pit is defined as the time between the start of the pit (at threshold crossing "b") and the end of the pit (at threshold crossing "d").

On the other hand, the first feature of the OR waveform is identified as a space if the waveform initially begins in zone 3 or enters zone 3 before zone 1 is entered. Similar to when the first feature is a pit, the starting point of the space is at the voltage threshold crossing (after it is "identified"). Then, after the so-called "first" condition is satisfied when the waveform enters zone 1 (zone 1 for an identified space, zone 3 for an identified pit), the end point of the space is identified at the next voltage threshold crossing.

The next feature to be identified in the illustrated example is a space, which begins at the end of the previous feature, as represented by reference "d". Then, for the end of the space to be identified, the above-mentioned "first" condition must be satisfied and the next threshold crossing thereafter is identified as the space's end point. That is, the waveform must first cross into zone 1, at reference "e", before a threshold crossing (at reference "f") is identified to be the space's end point.

The waveform of FIG. 3 does not include any "false" pits or "false" spaces. However, if the waveform did not enter zone 1 (at reference "e") after crossing the voltage threshold at reference "d", but instead re-crossed the voltage threshold at, for example, reference "f", that re-crossing of the voltage threshold is not considered to be the end point of the space. In this case, the end point of the space will not be identified until the above-discussed "first" condition of entering zone 1 is satisfied. Only after zone 1 is entered by the waveform is the subsequent threshold crossing identified as the end point of the space.

Figure 4:
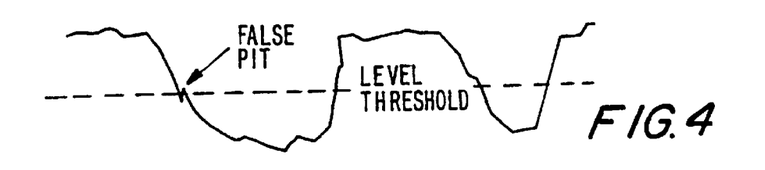
FIG. 4 is a schematic illustration of an OR data waveform having a false pit.

A re-crossing of the voltage threshold without the "first" condition being satisfied occurs when a "false" pit or a "false" space exists in the waveform. FIG. 4 illustrates a waveform having such a false pit, wherein it is seen that the waveform first crosses the voltage threshold (identifying the start of a space) and again crosses (or re-crosses) the voltage threshold prior to entering zone 1 thus representing a false pit. The optical recording measurement package disregards such false pits (and, similarly, false spaces) and continues to identify the waveform as a space until it enters zone 1 (i.e., until the "first" condition is satisfied) and thereafter crosses the voltage threshold level.

The above-described hysteresis adds an additional condition (the "first" condition) which must be met before a threshold crossing is recognized as a pit/space edge. In addition, pits and spaces alternate with one another throughout the entire OR data waveform and thus a pit is never identified immediately after another pit and a space is never identified immediately after another space. Subsequent features (pits/spaces) in the waveform are identified in the same manner the second feature is identified, that is, by crossing into the opposite zone after the end of the previous feature and then crossing the voltage threshold. Thus, the start of the next pit is identified at reference "f" (at the end of the space) in FIG. 3, and the end of that pit is identified at the first voltage threshold crossing after the waveform enters zone 3.

Therefore, the present invention defines each feature as existing between "qualified" threshold crossings of the OR waveform, wherein such qualified threshold crossings indicate that threshold crossings alone do not define the feature boundaries, but instead, the crossing must satisfy some hysteresis criteria.

Figure 5A:
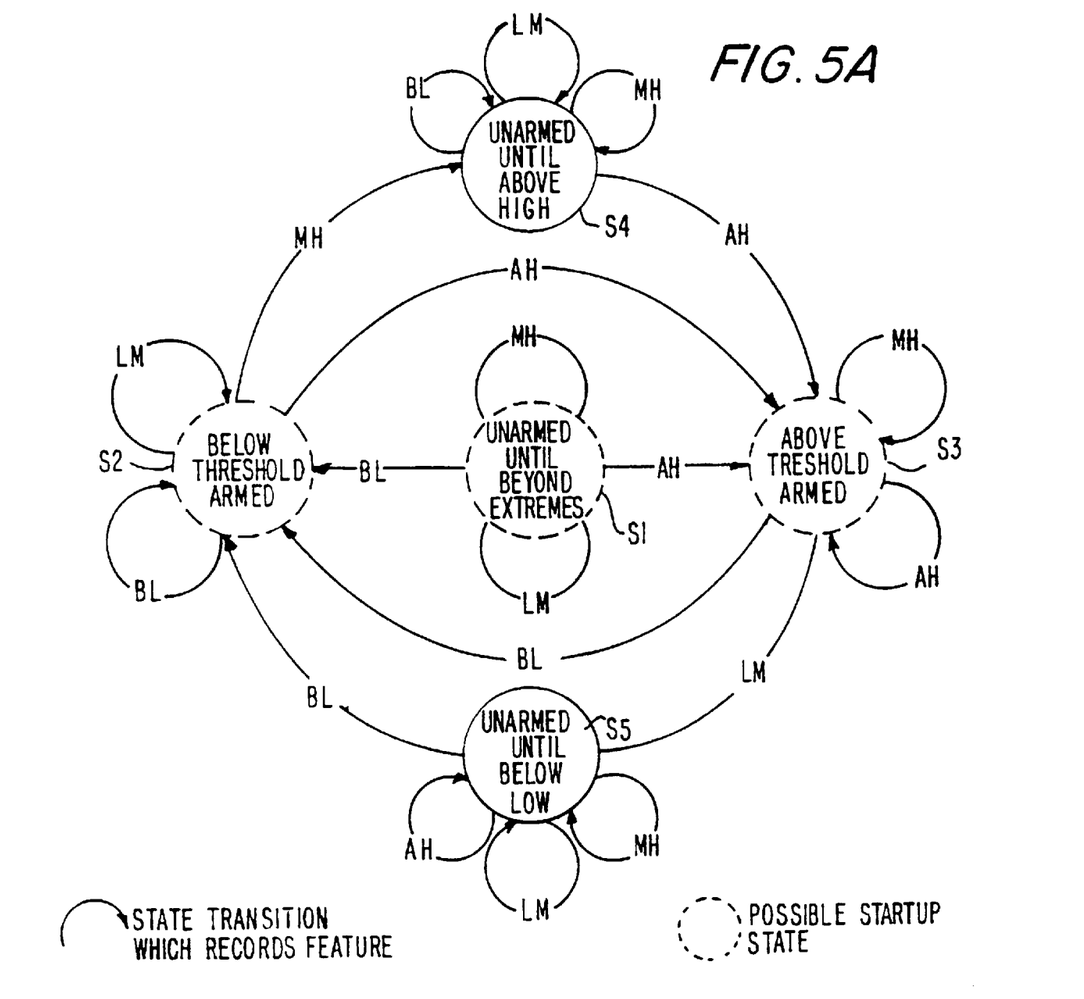
FIGS. 5A and 5B schematically illustrate the state machine used to identify features in accordance with the present invention.
Figure 5B:
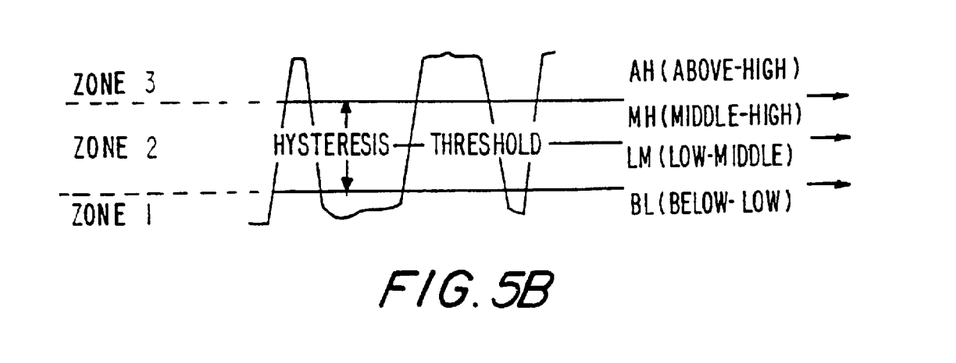

In a preferred embodiment of the optical recording measurement package of the present invention, the above-discussed feature (pit/space) identification is carried out by means of a "state machine", which is schematically shown in FIG. 5A of the drawings. The state machine may be carried out in hardware form or in software form and consists of five possible states S1, S2, S3, S4 and S5. At start-up (i.e., at the beginning of the OR data waveform), the optical recording measurement package may enter either state S1, state S2 or state S3 depending on the initial level of the OR waveform. FIG. 5B illustrates that the OR waveform may be in one of four possible "regions". Region AH (or the above high region) corresponds to zone 3 of the hysteresis band and region BL (or the below low region) corresponds to zone 1 of the hysteresis band. Zone 2 of the hysteresis band is divided into two regions MH and LH, region MH (or the middle-high region) corresponding to those levels above the threshold level within zone 2, and region LM (or the low-middle region) corresponding to those levels below the threshold level within zone 2.

Referring to FIG. 5A, the dotted circles (states S1, S2 and S3) represent the possible start-up states and, as will be discussed, the arrows identify into which state the state machine enters (or remains) depending upon the level of the OR waveform. State S1 is identified as "Unarmed until beyond extremes" and corresponds to when the waveform is initially in zone 2. State S2 is identified as "Below Threshold Armed" and corresponds to when the above-discussed "first" condition is satisfied after a space is "identified". State S3 is identified as "Above Threshold Armed" and corresponds to when the "first" condition is satisfied after a pit is "identified". State S4 is identified as "Unarmed until above high" and corresponds to when a pit is "identified", but before the first condition is satisfied. State S5 is identified as "Unarmed until below low" and corresponds to when a space pit is "identified", but before the first condition is satisfied.

At the initial sampling of the OR waveform, the state machine begins in state Si when the waveform begins in either region MH or LM of zone 2. In this state, the machine is said to be unarmed since a threshold crossing while the waveform is in state S1 is disregarded. The state machine remains in state S1 until the waveform enters the BL region (zone 1) or the AH region (zone 3), at which point, either state S2 or state S3 is entered as indicated by the arrows extending to states S2 and S3 from state S1. The state machine, instead, may initially start in either state S2 or state S3 if the initial sample of the waveform is in either the BL region (zone 1) or the AH region (zone 3), respectively.

In states S2 and S3, the state machine is said to be "armed" to indicate that the beginning of a feature (pit or space) is identified at the next threshold crossing. Referring back to FIG. 3, entering state S2 corresponds to when the waveform crosses into zone 1 (e.g., at reference "a") and entering state S3 corresponds to when the waveform crosses into zone 3 (e.g., at reference "c").

The state machine shown in FIG. 5A further illustrates as the bold-faced arrows those state transitions at which a feature edge is identified (i.e., recorded) in the waveform. As previously mentioned, the beginning of one feature (pit or space) occurs at the end of the previous feature thus representing the feature edge.

When the state machine is in state S3, either initially or after a transition to state S3, the state machine remains in this state while the waveform remains in either the AH region or the MH region, i.e., while the waveform does not cross the voltage threshold. There is a transition from state S3 to state S5 when the waveform enters the LM region (i.e., when the waveform crosses the voltage threshold), and the threshold crossover point is identified as a feature edge (the end point of the previously identified pit, if applicable, and the start point of the newly identified space). The state machine of FIG. 5A further illustrates that if the waveform rapidly dropped from above the voltage threshold to the BL region (zone 1), there is a transition from state S3 to state S2 and again the threshold crossover point is identified as a feature edge. Moreover, the state machine is armed in state S2 since the "first" condition of crossing into zone 1 (region BL) is satisfied and thus the subsequent threshold crossover point is identified as another feature edge. However, the state machine is unarmed when in state S5 (i.e., the first condition is not satisfied yet) and remains in state S5 until the waveform enters the BL region (zone 1), at which point, there is a transition to state S2.

After the state machine enters state S2, the state machine remains in this state while the waveform remains in either the LM or BL regions, i.e., while the waveform does not cross the voltage threshold. There is a transition from state S2 to state S4 when the waveform enters the MH region (i.e., when the waveform crosses the voltage threshold), and the threshold crossover point is identified as a feature edge (the end point of the previously identified space, if applicable, and the start point of the newly identified pit). If, however, the waveform rapidly rose from below the voltage threshold to the AH region (zone 3), there is a transition from state S2 to state S3 and again the threshold crossover point is identified as a feature edge. Then, in state S2, the system is armed since the "first" condition of crossing into zone 3 (region AH) is satisfied and thus the subsequent threshold crossover point is identified as another feature edge. However, the state machine is unarmed when in state S4 (i.e., the first condition is not satisfied yet) and remains in state S4 until the waveform enters the AH region (zone 3), at which point, there is a transition to state S3.

The state machine proceeds in the above-described manner for subsequent waveform level changes so as to identify and record the starting and ending points of every feature of the waveform. The process of identifying the boundaries of each feature of the OR data waveform in the above-discussed manner is called extracting the features from the waveform and occurs by calling or executing an extract function of the optical recording measurement package of the present invention.

The Feature Buffer

Figures 6, 7:
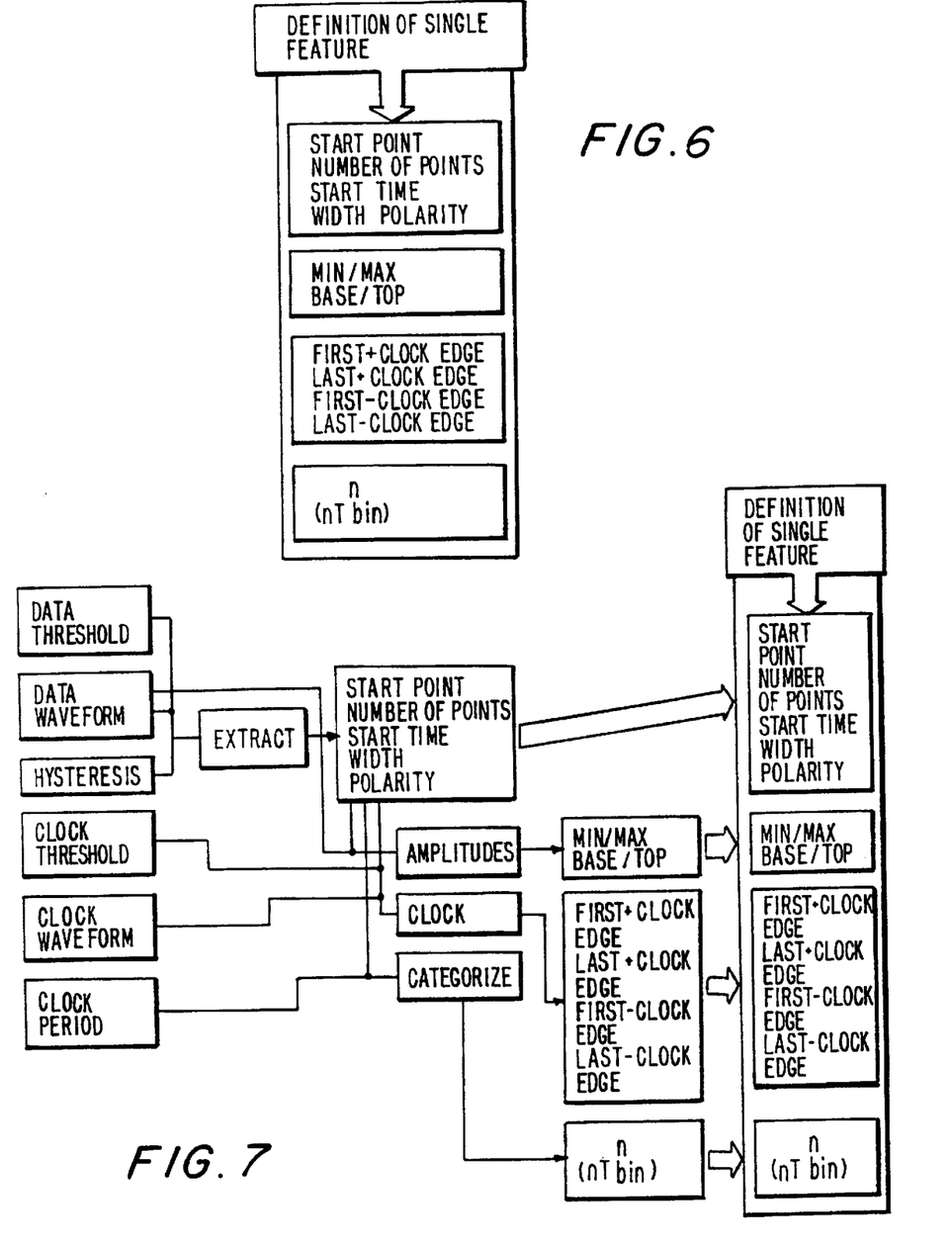
FIG. 6 is a schematic illustration of the data structure of the structure element of a feature.
FIG. 7 schematically illustrates the various functions used to derive the structure element of a feature.

In accordance with another aspect of the present invention, the optical recording measurement package includes a feature buffer which is comprised of an array of structures for storing data pertaining to each feature of an OR data waveform. Each array element of the feature buffer stores data for a respective identified or "extracted" feature and has a data structure as shown in FIG. 6. Each feature of an OR waveform is defined by its start point (e.g., the position of the first sample of the particular feature), the number of points in the feature, the start time of the feature, the width of the feature (which also defines the end time), the feature's polarity, the minimum/maximum level of the feature, the base/top of the feature, the first/last +/− clock edge values of the feature, and the index "n" (or the nT bin) to which the feature belongs.

As will be further discussed, the width of a feature is defined by the time difference between the threshold crossover points defining the boundaries of that feature. Each feature has either a positive polarity defining it as a pit or a negative polarity defining it as a space. The minimum/maximum level of a feature identifies the minimum voltage level of the feature if it is a space or the maximum voltage level of the feature if it is a pit. The base/top value of a feature identifies the so-called "top" portion of the feature if it is a pit or the so-called "bottom" portion of the feature if it is a space (to be further discussed). The first/last +/− clock edge values of a feature are four values indicating the time between the leading edge of the feature and the nearest positive clock edge, the time between the leading edge of the feature and the nearest negative clock edge, the time between the trailing edge of the feature and the nearest positive clock edge, and the time between the trailing edge of the feature and the nearest negative clock edge. Finally, the index "n" of a feature identifies the particular ideal width of the feature in terms of the clock period T (to be further discussed).

A description of the operation of obtaining feature buffer data by the optical recording measurement package will be provided with reference to FIG. 7 of the drawings. As previously discussed, the optical recording measurement package "extracts" or identifies each feature (pit/space) in an OR data waveform by scanning the waveform for hysteresis "qualified" threshold crossings. The so-called "extract" function may be performed after an OR waveform (data waveform) is acquired, and after the voltage threshold level (data threshold) and the hysteresis level (i.e., the width of zone 2) are provided. As shown in FIG. 7, the first five elements of each feature structure (start point, number of points, start time, width and polarity) are obtained by the extract function.

After performing the extract function, an "amplitude" function may be executed, which primarily calculates the base/top value and the min/max value of each or selected features. The calculation of the base/top value is further discussed below.

Also after performing the extract function, a "clock" function may be performed to identify the clock edges of a clock waveform and then to calculate the time difference between the leading and/or trailing edges of each or selected features and the nearest positive and/or negative clock edges. To perform the clock function, a clock waveform and a clock threshold are provided, wherein the clock threshold is used to qualify threshold crossings of the clock waveform in a manner similar to that of qualifying threshold crossings to identify the features edges. That is, the previously discussed state machine may be utilized to determine the clock waveform hysteresis qualified threshold crossings.

Categorization of Features

The final element of each feature structure is the index "n" which represents the particular ideal width of the feature in terms of the clock period T. After the extract function is performed and when the ideal clock period T is supplied, a "categorize" function may be performed to categorize each or selected features into the appropriate "nT bin". As previously discussed with reference to FIGS. 1A–1D, OR data is encoded using a pulse width modulation mechanism to produce successive pits/space whose widths are ideally integral multiples of the data clock period T. The optical recording measurement package, in accordance with the present invention, separates the pits and space (i.e., the features) into groups whose widths fall into the same integral multiple of clock periods. Categorization of a given feature is accomplished using its width "w", the ideal clock period T, and equation 1 below, wherein the value of "n" that satisfies the equation represents the "index" of the given feature.

$$(n-0.5)\cdot T \leq w < (n+0.5)\cdot T \quad (1)$$

Equation 1 ascertains that index (i.e., the nT value) to which the width of the feature is closest, and each feature (pit or space) is categorized herein as belonging to the $n^{th}$ index. Thus, the first feature (i.e., pit) of the waveform of the FIG. 1A belongs to the third index (n=3), the next feature (i.e., space) belongs to the fourth index (n=4), and the last feature shown (i.e., pit) belongs to the fifth index (n=5).

In addition to the bin number, each feature is categorized by its polarity (positive/negative or pit/space) so that the optical recording measurement package is operable to analyze one or more categories of features, each category being defined by its bin number (n) and its polarity, as will be further discussed.

Dependency Based or On-Demand Calculation

A further aspect of the optical recording measurement package of the present invention is to build the feature buffer (FIG. 6) of selected or all features of the OR data waveform only when necessary (i.e., on-demand). That is, no operation or calculation is performed until it is necessary. For example, a request for the "top" value of selected pits and/or spaces of the OR data waveform would "call" the amplitude function if the required amplitude data had not already been computed which would, in turn, call the extract function if the features of the OR data waveform have not already been extracted. Thus, if the extract function had already been carried out, then only the amplitude function would need to be performed for the optical recording measurement package to provide the necessary top data. If the amplitude function already was previously performed, then the required data to calculate the requested information (which, for example, may be the average value of pit "tops") would already be stored in memory, thus substantially speeding the processing time. Since there may be on the order of tens or even hundreds of thousands of data samples, each function shown in FIG. 7 may require a substantial amount of processing time. However, by performing calculations only on-demand provides the advantageous result of only performing those calculations that are necessary to ascertain the specific data requested. Thus, unnecessary calculations are avoided.

Each of the feature buffer areas corresponding to the four functions (i.e., extract, amplitude, clock and categorize) are provided with an appropriate flag which is set as a result of successful operation of the respective function, but which is reset (cleared) when data from which the calculations depend are modified. For example, supplying a new OR data waveform would reset all of the flags since all of the functions utilize the waveform or data derived from the waveform and thus generally any data request would require at least the extract function, and any other necessary function, to be performed (i.e., re-executed). As another example, supplying a different clock waveform and a different clock period would reset flags associated with the clock and categorize functions since only these functions utilize this information. Therefore, a request for, for example, the average of the top of all features would not require execution or re-execution of any of the four discussed functions. However, a request for the average of the base/top of features belonging to the 3rd index (or any other index or any supplied range of "n") would require execution of the categorize function since the index n of each feature is derived from the altered clock period.

Statistics Buffer

Figure 8:
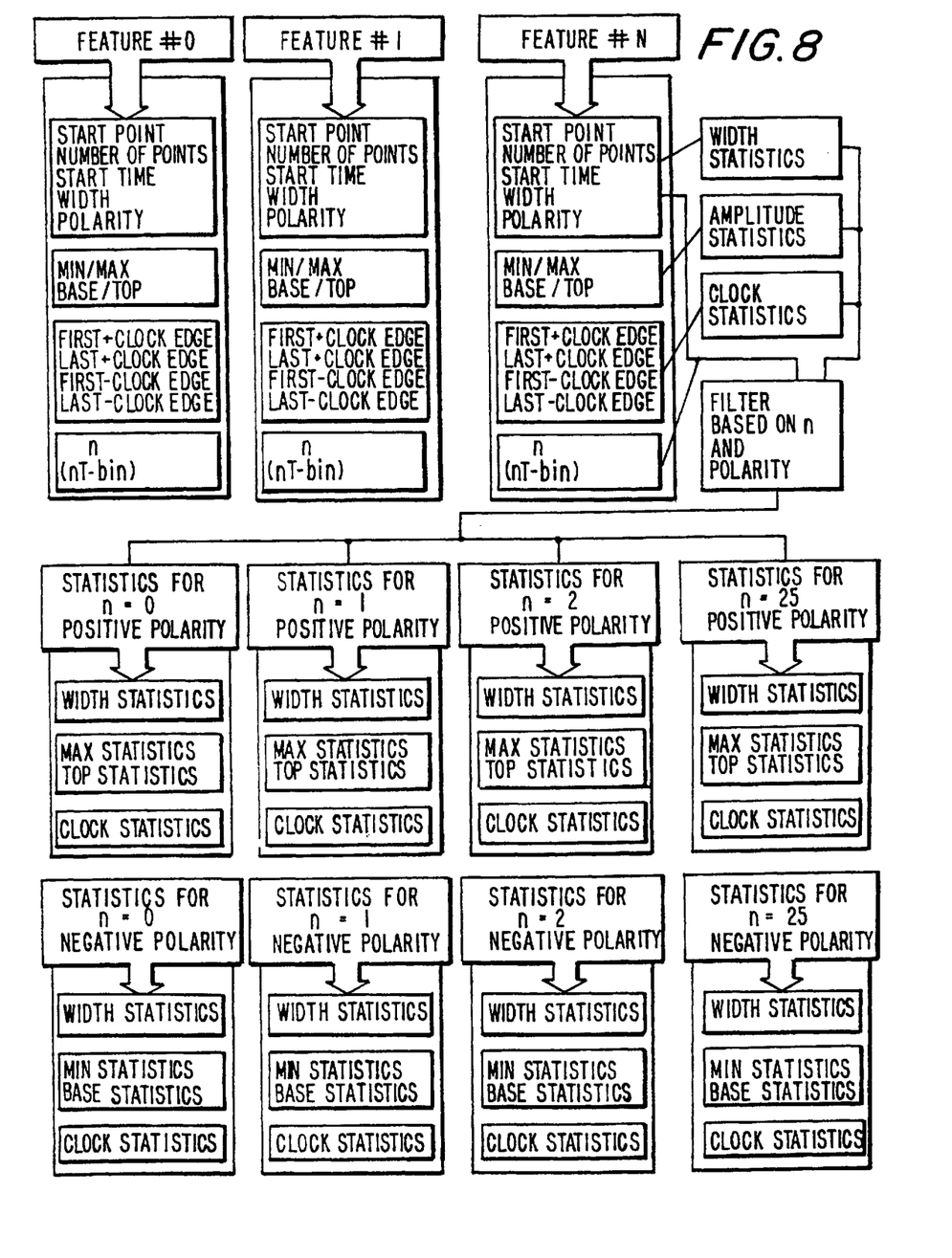
FIG. 8 schematically illustrates the data structure of the statistics buffer and the various functions used to derive statistics information from the feature buffer.

In addition to a feature buffer, the optical recording measurement package further includes a statistics buffer which includes an array of elements for each value of n and polarity. Given a range of n from 0 to 25, and the fact that there are two polarities, positive and negative, the statistics buffer is said to be a 2×26 array of structures, which is schematically shown in FIG. 8. Each element (n, polarity) of the statistics buffer includes width statistics, amplitude statistics and clock statistics which correspond to various statistical data pertaining to the width, the min/max and base/top values, and the clock edge data, respectively, of those features belonging to the respective $n^{th}$ index and having the respective polarity.

Calling the statistics buffer computation functions will force the computation of feature buffer data which must be computed prior to statistics accumulation, if not already performed, and each statistics element of each statistics structure (n, polarity) may contain requisite items such as sum, sum_squared, etc., which are required for various statistics including, e.g., average and standard deviation calculations. The accumulation of statistics involves: (1) first performing the required feature buffer calculation, (2) categorizing each feature into a polarity and n based on the width, and (3) for each feature, modifying the statistics of the appropriate statistics structure (n, polarity) by adding one to the total number of features within the respective statistics structure (so as to keep track of the number of features within each category (n, polarity)) adding the respective values (e.g., width value, base/top value, etc.) to the respective sum accumulators, adding the square of the respective values to the respective sum-squared accumulators, and redetermining the minimum values and the maximum values supplied with respect to the respective statistics (e.g., width, base/top, etc.).

Like the feature buffer computation functions, the statistics buffer computation functions are only run when necessary (on-demand), and, as previously mentioned, may call feature buffer computation functions. For example, requiring the feature average amplitude would call the "amplitude statistics" computation function for selected n values (the n range of interest), for both polarities, which may in turn force computation of amplitudes for each feature, which may in-turn force feature extraction. The "filter based on n and polarity" in FIG. 8 functions to filter the proper category of features to the particular statistics structure (n, polarity) being built.

Figure 9:
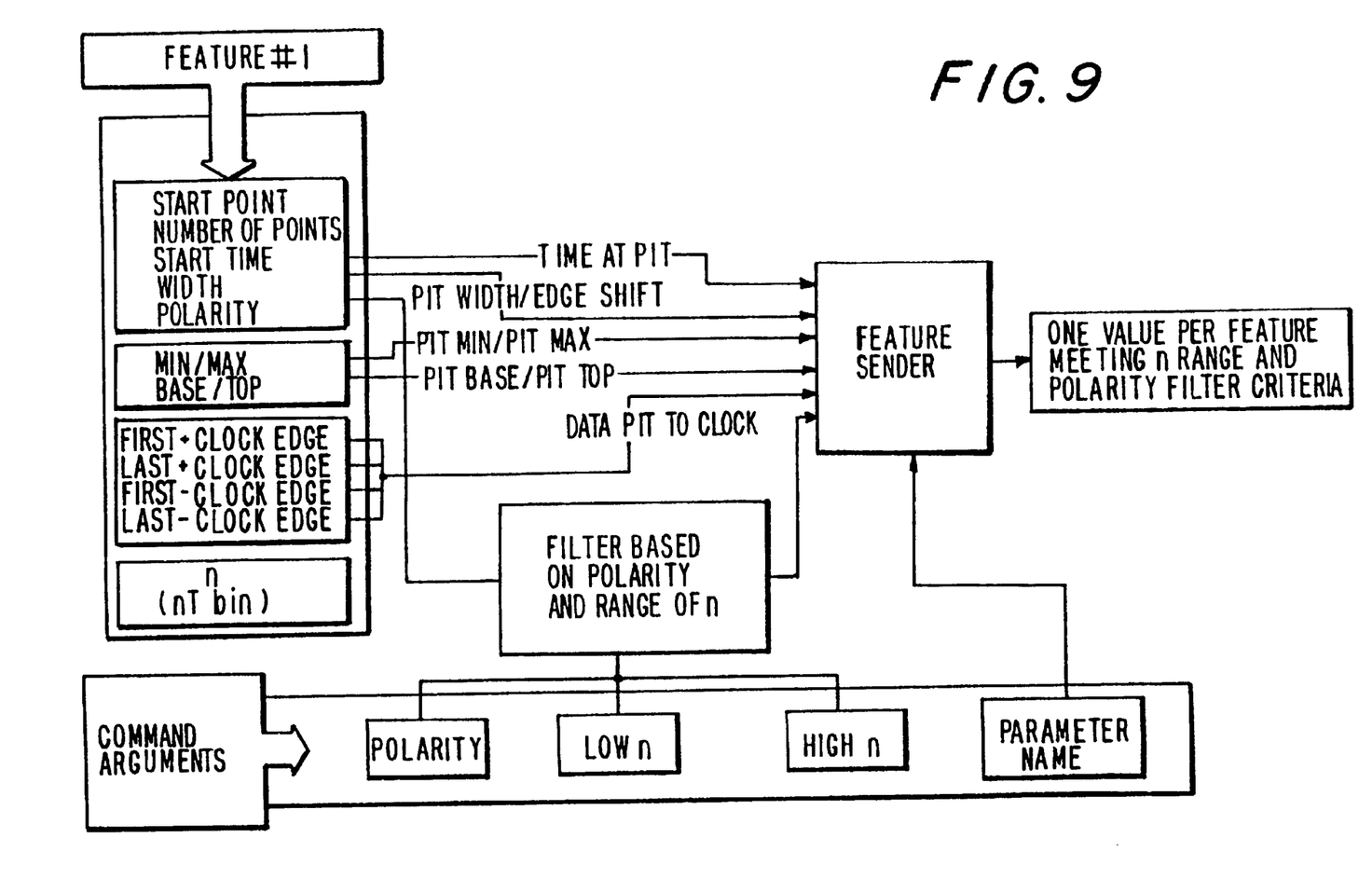
FIG. 9 is a schematic illustration of the flow of various data when the feature sender function is invoked.

The feature buffer and statistics buffer computation functions may also be invoked as a result of a "feature sender" invocation, which is a function that is capable of sending one result per feature of the specified polarity within the specified range of n. FIG. 9 is a schematic illustration of the flow of various data when the feature sender function is invoked. The output of the feature sender may be directed into trends, graphs, histograms, etc., for further analysis or display.

Figure 10:
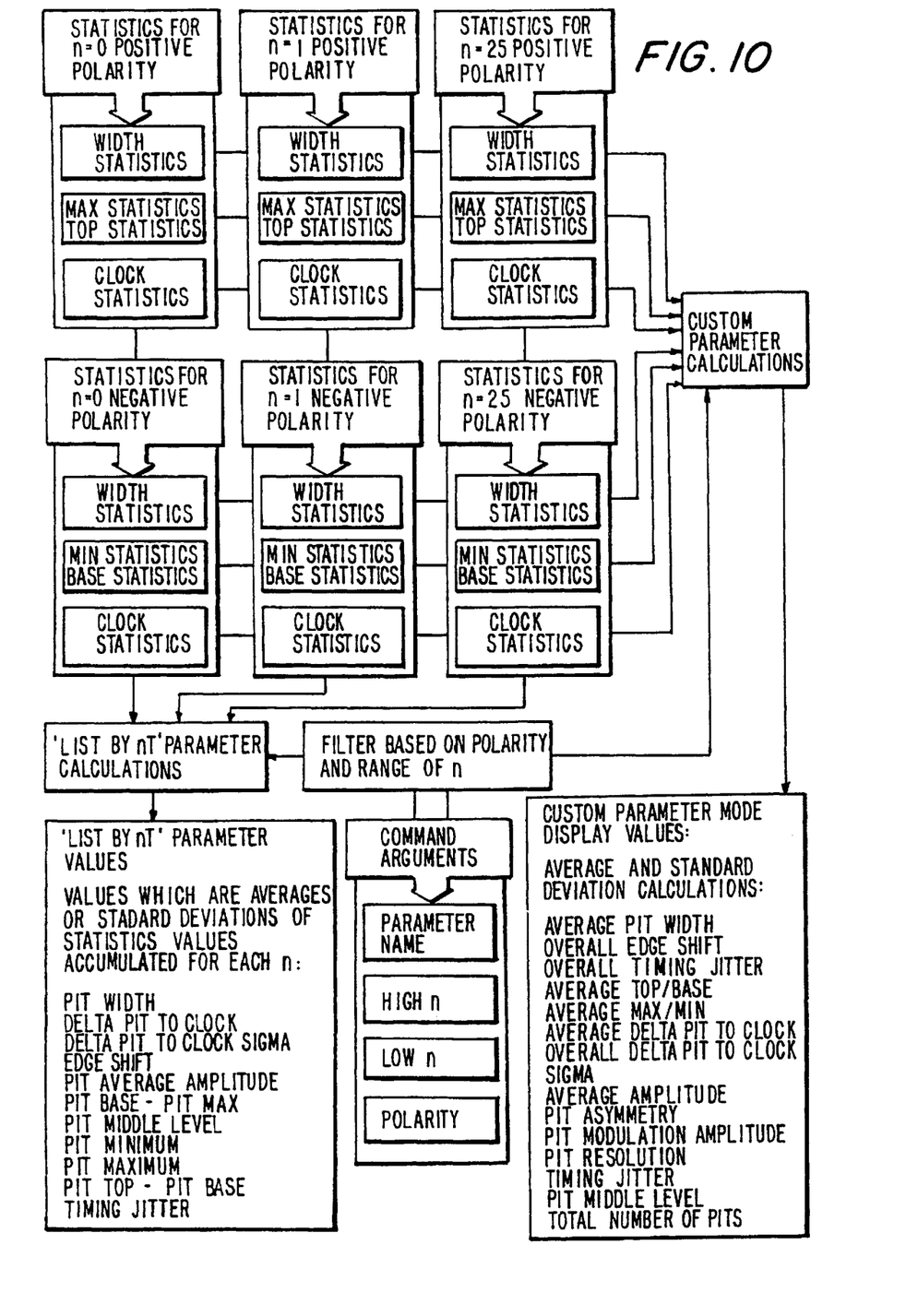
FIG. 10 schematically illustrates the operation of custom parameter and "List by nT" parameter calculations.

Many parameters do not have results which are on a per feature basis. Even the parameters that do have one value per feature must display an average value of the parameter display line. FIG. 10 schematically illustrates how these values result from previous statistics buffer calculations.

Custom parameters which have a result per feature are displayed as an overall average of the values calculated. These overall averages are calculated by merging data from separate statistics array elements. Other parameters perform a special calculation function and return one result per waveform acquisition. These parameters use algebraic combinations of statistics buffer array elements.

List by nT Mode

Another aspect of the optical recording measurement package of the present invention is identified herein as "List by nT" mode in which information is displayed in a special manner, characterized by index n. That is, the optical recording measurement package provides a means for viewing data, as well as analyzing data (as previously discussed) as a function of the width of the feature (pit/space). For example, given a value n, or a range of values of n, the average width of each pit/space belonging to the $n^{th}$ (e.g., third) index is supplied (e.g., displayed to the user). If a range of n of 3–11 is provided, eight values are supplied to the user: the "3T" average pit width, the "4T" average pit width, . . . , up to the 11th T average pit width, wherein "3T" corresponds to the ideal pit width of a pit belonging to the third index, etc. Thus, "List by nT" mode allows the user to look at many of the measurements as a function of pit/space cell size (nT).

When the optical recording measurement package of the present invention is incorporated into a digital storage oscilloscope (DSO), a substantial number of measurement types can be selected to be displayed to the user in the List by nT mode. Currently, and as previously mentioned, DSOs neither analyze nor display waveforms as a function of categorized features. In accordance with the present invention, a multiple number of measurement types may be provided as a function of feature (pit/space) width in "List by nT" mode, such measurement types including "delta pit to clock" which provides a measurement of the time between the leading edge of pit/spaces of interest and the nearest specified clock edge, "delta pit to clock sigma" which provides a measurement of the mean normalized standard deviation of the delta pit to clock measurements, "edge shift" which provides a measurement of the difference of the width of pits and/or spaces from their ideal widths, "pit average amplitude" which provides a measurement of the average amplitude of pits/spaces, "pit base" which provides a measurement of the best estimate of the bottom amplitude of a space (to be further discussed), "pit maximum" which provides a measurement of the maximum voltage value of pits of interest, "pit middle level" which provides a measurement of the middle voltage level of pits/spaces, "pit minimum" which provides a measurement of the minimum voltage value of pits of interest, "pit number" which provides a measurement of the number of pits and/or spaces of interest, "pit top" which provides a measurement of the best estimate of the top amplitude of a pit (to be discussed), "pit width" which provides a measurement of the width of pits and/or spaces of interest, "timing jitter" which provides a measurement of the standard deviation of the difference of the width of pits and/or spaces from the mean width, and so on. These measurement types are described in detail in LeCroy Corporation's Optical Recording Measurement Package Operator's Manual, part #: 93XX-OM-MAN (Revision 1.0, dated Apr. 22, 1996), which is incorporated herein by reference.

Figure 11:
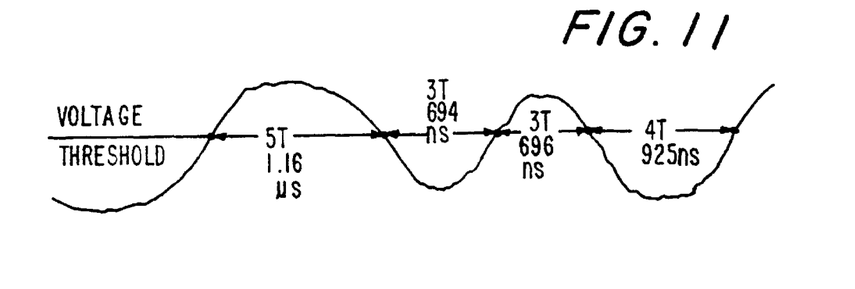
FIG. 11 is an OR data waveform used to explain the operation of the "List by nT" mode of the present invention.

Each of the above measurement types may be displayed without regard to the "nT" characterization of each pit/space in the optical recording measurement package. However, the waveform shown in FIG. 11 illustrates one example of the usefulness of the "List by nT" mode of the present invention. The OR data waveform shown contains in sequence a 5T pit, a 3T space, a 3T pit and a 4T space. If the user selected to display the average pit and space in a typical display mode, the average pit width would be calculated to equal 868.75 ns, as shown in equation 2.

$$\frac{(1.16 \mu s + 694 \text{ ns} + 696 \text{ ns} + 925 \text{ ns})}{4} = 868.75 \text{ ns} \qquad (2)$$

However, in "List by nT" mode and a selection of n=3, the average pit width would be calculated to equal 695 ns, as shown in equation 3.

$$\frac{(694 \text{ ns} + 696 \text{ ns})}{2} = 695 \text{ ns} \qquad (3)$$

Pit/space width and its error margin are especially important in optical recording systems since OR data is encoded in the widths of the pits/spaces. While ideal widths of pits/spaces are exact integer multiples of the period of the clock used to sample the OR data waveform, real waveforms provide pit/space widths that need to be analyzed separately by n and polarity.

Figure 12:
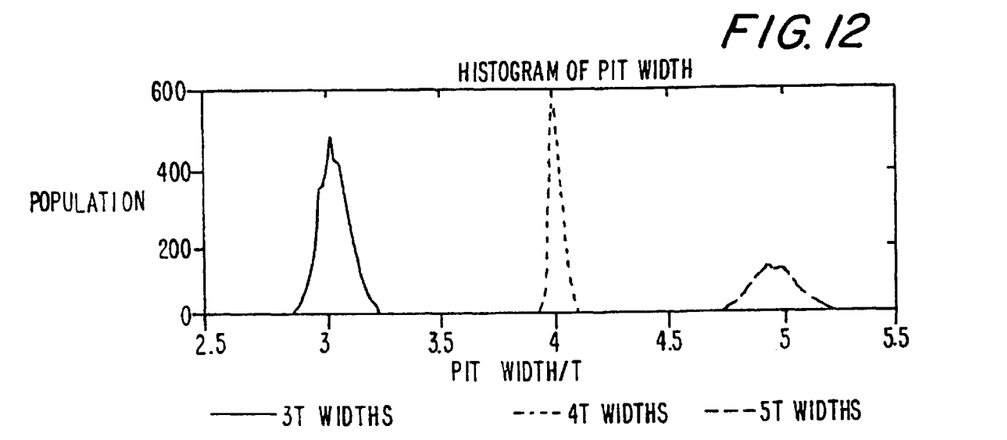
FIG. 12 illustrates an exemplary histogram display of pit widths in the "List by nT" mode of the present invention.
Figure 13:
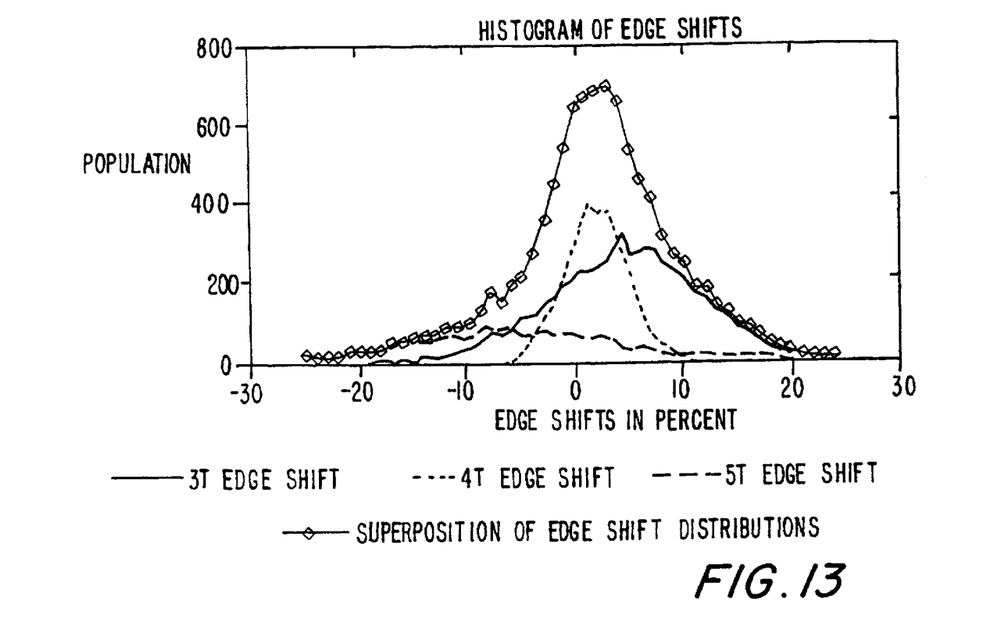
FIG. 13 is an exemplary histogram diagram of pit edge shift in the "List by nT" mode of the present invention.

The "List by nT" mode of the present invention is further operable to display information in terms of the nT grouping in other manners including, for example, in histogram form. FIG. 12 illustrates an exemplary histogram display of pit widths, wherein the population (i.e, the number) of pits/ spaces for selected values of n (here, n=3, 4, 5) are shown. The example histogram shows that the width of the pit/ spaces belonging to the fourth index have a narrow spread, while the width of the pits/spaces belonging to the fifth index have a relatively large spread. FIG. 13 is another exemplary histogram diagram of the parameter "edge shift" being displayed in "List by nT" mode, wherein the "3T", "4T" and "5T" edge shift distributions illustrate what is displayed when single values of n (e.g., n=3, n=4, n=5) are provided, and the "superposition" distribution represents what is displayed when a range of n (e.g., n=3 to 5) is provided. From the example histogram shown in FIG. 13, it is seen that both types of information cannot be provided unless each of the features (pit/spaces) of the OR data waveform is categorized by "nT" and polarity. While not shown, categorizing the features by polarity further allows the user to separately analyze and/or display data pertaining to pits and spaces separately.

Base/Top Calculation

The optical recording measurement package of the present invention provides for the calculation of the "base" of each (or selected) space(s) and the "top" of each (or selected) pit(s) of the OR data waveform, which calculations were previously estimated only from eye-examination of persistence plots. Generally, the "top" represents the most intense region near the top of the waveform of a pit in an eye-pattern persistence map, and, similarly, the "bottom" represents the most intense region near the bottom of a waveform of a space in an eye-pattern persistence map. In accordance with the present invention, the base/top is calculated in a unique manner, discussed below, and the base/ top of all spaces/pits are calculated independently so that it becomes possible to identify rogue amplitude variations in the waveform.

Figure 14:
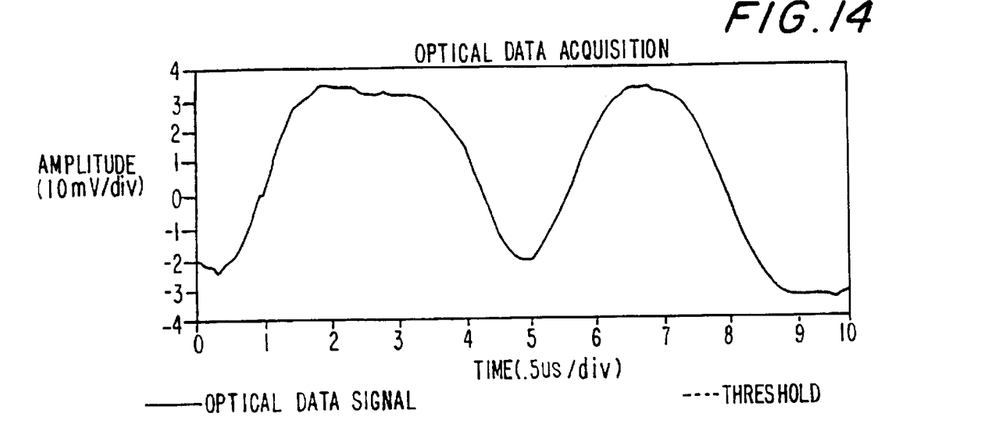
FIG. 14 is an OR data waveform used to explain the operation of the base/top calculation of the present invention.
Figure 15:
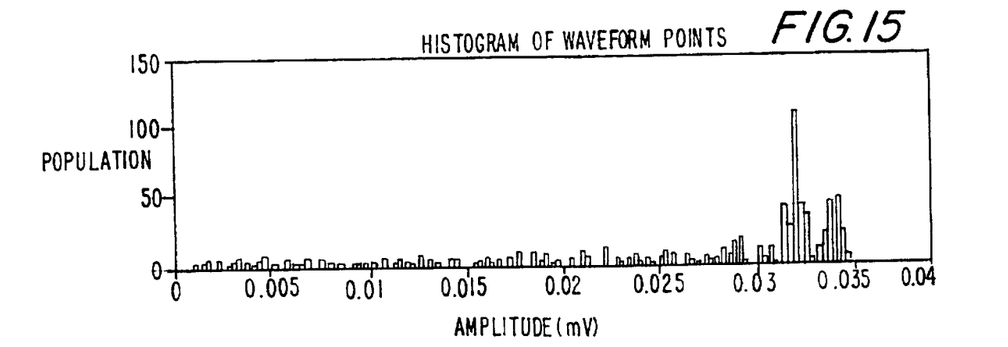
FIG. 15 is a histogram of the waveform points of the first pit shown in FIG. 14.

FIG. 14 is an OR data waveform having a space and two pits. Considering only the first pit in the waveform, the optical recording measurement package histograms the values of the waveform of the considered pit, and the histogram of the waveform points is shown in FIG. 15. The most intensely populated region (in this case, 31.9 mV) is taken as the "most likely amplitude", and the "top" is calculated by averaging all of the waveform data points at or above 31.9 mV, which results in a "top" value of 32.89 mV.

Figure 16:
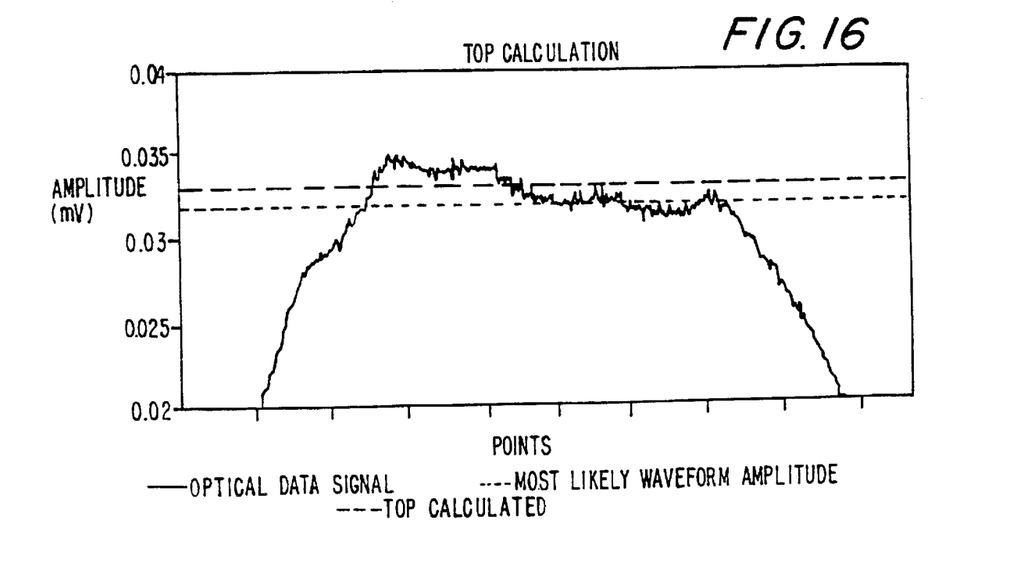
FIG. 16 illustrates a plot showing the "top" value of a pit of the OR data waveform in accordance with the present invention.

Referring to FIG. 16, which illustrates a plot showing the OR data waveform, the calculated "top" value, and the "most likely amplitude", it is seen that the "top" bisects the two flatness regions of the waveform in this example.

The "base" calculation for a given space is performed in a similar manner to the calculation of the "top" value, but represents the most intense region near the bottom of the waveform in an eye-pattern persistence map.

While the present invention has been particularly shown and described in conjunction with preferred embodiments thereof, it will be readily appreciated by those of ordinary skill in the art that various changes may be made without departing from the spirit and scope of the invention. For example, although the present discussion is directed to an optical recording measurement package which analyzes OR data waveforms, the present invention is not limited to optically recorded waveforms and may be applied to other types of pulse-width modulated waveforms.

Therefore, it is intended that the appended claims be interpreted as including the embodiments described herein, the alternatives mentioned above, and all equivalents thereto.

What is claimed is:

1. Method of identifying features in a waveform, comprising the steps of:

determining when said waveform enters one of a first and third zones, said one of said first and third zones into which said waveform enters signifying a designated zone, said first zone representing levels below a second zone, said second zone representing a range of levels including a predetermined threshold level, and said third zone representing levels above said second zone;

identifying, after when said waveform enters said designated zone, a position of said waveform at which said waveform crosses said predetermined threshold level, said position identifying a feature edge of said waveform;

determining when said waveform enters the other of said first and third zones that is not said designated zone;

identifying, after when said waveform enters said other of said first and third zones, a next position of said waveform at which said waveform crosses said predetermined threshold level, said next position identifying another feature edge of said waveform;

repeating said first through fourth steps until an end of said waveform is reached; and identifying, after the end of said waveform is reached, each feature of the waveform from the identified features edges.

2. The method of claim 1, wherein said step of identifying each feature is carried out by identifying each feature of the waveform as a respective portion of the waveform between respective successively identified feature edges.

3. The method of claim 1, wherein said waveform is a pulse-width modulated waveform.

4. Method of identifying features in a waveform, comprising the steps of:

identifying a first position of said waveform having a level within one of a first and third zones, said one of said first and third zones in which said level of said first position is within signifying a starting zone, said first zone representing levels below a second zone, second zone representing a range of levels including a predetermined threshold level, and said third zone representing levels above said second zone;

identifying, after said first position is identified, a subsequent position of said waveform at which said waveform crosses said predetermined threshold level, said subsequent position identifying a beginning position of a first feature;

determining, after the subsequent position is identified, when said waveform enters another of said first and third zones that is not said starting zone;

identifying, after when said waveform enters said another of said first and third zones, a second subsequent position of said waveform at which said waveform crosses said predetermined threshold level, said second subsequent position identifying an ending position of said first feature and identifying a beginning position of a successive feature;

determining, after the second subsequent position is identified, when said waveform again enters said starting zone;

identifying, after when said waveform again enters said starting zone, a next subsequent position of said waveform at which said waveform crosses said predetermined threshold level, said next subsequent position identifying an ending position of said successive feature and identifying a beginning position of another successive feature; and repeating said third through sixth steps until an end of said waveform is reached.

5. The method of claim 4, wherein said predetermined threshold level represents a mid-point of said range of levels of said second zone.

6. The method of claim 4, wherein said waveform is an optical recording waveform reproduced from an optical recording-type record medium, and the second identifying step is carried out by identifying the first feature as a pit of the record medium when the identified first position of said waveform has a level within said first zone, and by identifying the first feature as a space of the record medium when the identified first position of said waveform has a level within said third zone.

7. The method of claim 4, wherein each of said first and second determining steps includes the step of identifying said successive feature as a pit when said waveform enters said first zone and as a space when said waveform enters said third zone, the beginning position of said successive feature being identified after the respective first and second determining steps.

8. The method of claim 4, wherein the range of levels represented by the second zone corresponds to a hysteresis characteristic of the waveform.

9. Method of identifying features in a waveform using a state machine having a plurality of states, comprising the steps of:

entering one of said states in accordance with an initial level of said waveform, said initial level of said waveform being within one of a plurality of regions, a first of said regions representing levels below a range of levels represented by a second region, a third of said regions representing a range of levels above said second region, and a fourth of said regions representing levels above said third region;

entering a second of said states when said waveform changes to a level within said first region and said state machine is in one of first predetermined selected ones of said plurality of states;

entering a third of said states when said waveform changes to a level within said fourth region and said state machine is in one of second predetermined selected ones of said plurality of states;

entering a fourth of said states when said waveform changes to a level within said third region and said state machine is in a third predetermined selected one of said plurality of states;

entering a fifth of said states when said waveform changes to a level within said second region and said state machine is in a fourth predetermined selected one of said plurality of states;

storing a position of said waveform when the state machine enters the second state from the third state, enters the fourth state from the second state, enters the third state from the second state or enters the fifth state from the third state; and identifying each feature of said waveform from the stored positions of said waveform.

10. The method of claim 9, wherein said first entering step is carried out by entering said first state when said waveform has said initial level within one of said second and third regions, by entering said second state when said waveform has said initial level within said first region, and by entering said third state when said waveform has said initial level within said fourth region.

11. The method of claim 9, wherein said first predetermined selected states include said first, third and fifth states such that said step of entering said second state is carried out when said state machine is in one of said first, third and fifth states and said waveform changes to a level within said first region.

12. The method of claim 9, wherein said second predetermined selected states include said first, second and fourth states such that said step of entering said third state is carried out when said state machine is in one of said first, second and fourth states and said waveform changes to a level within said fourth region.

13. The method of claim 9, wherein said third predetermined selected state is the second state such that said step of entering said fourth state is carried out when said state machine is in said second state and said waveform changes to a level within said third region.

14. The method of claim 9, wherein said fourth predetermined selected state is the third state such that said step of entering said fifth state is carried out when said state machine is in said third state and said waveform changes to a level within said second region.

15. The method of claim 9, wherein the step of identifying each feature is carried out by identifying each feature of the waveform as a respective portion of the waveform between respective successively stored positions of said waveform.

16. The method of claim 9, further comprising the step of identifying a current position of said waveform as a beginning position of a pit when the state machine enters the fourth state from the second state or enters the third state from the second state, and as a beginning position of a space when the state machine enters the second state from the third state or enters the fifth state from the third state.

17. Method of identifying features in a waveform, comprising the steps of:

receiving a waveform;

extracting each feature in the waveform in accordance with a predetermined threshold level and a predetermined hysteresis level, each extracted feature including a starting position in the waveform and a polarity level; and storing the starting position and the polarity level of each said extracted feature in a respective feature buffer.

18. The method of claim 17, wherein said step of extracting is carried out by ascertaining qualified crossings of said threshold level by the waveform using the hysteresis level, the starting position of each said feature corresponding to a respective one of the ascertained qualified crossings of said threshold level.

19. The method of claim 18, further comprising the step of determining a width of each said feature from a difference between the starting position and an ending position of the respective feature; and said step of storing includes storing the width of each said feature in the respective feature buffer.

20. The method of claim 17, wherein the polarity level of each said feature identifies the respective feature as either a pit or a space.

21. The method of claim 17, further comprising the step of identifying an amplitude level of each said extracted feature and storing each identified amplitude level in the respective feature buffer.

22. The method of claim 17, further comprising the steps of receiving a clock waveform and a clock threshold level;

qualifying threshold crossings of the clock waveform in accordance with the clock threshold level; and identifying edges of the clock waveform from the qualified threshold crossings.

23. The method of claim 22, wherein each said extracted feature includes a leading edge and a trailing edge, and said identified edges of the clock waveform alternate between positive and negative edges; said method further comprising the steps of calculating a time difference between the leading edge of each said feature and a nearest one of said positive edges of the clock waveform; calculating a time difference between the leading edge of each said feature and a nearest one of said negative edges of the clock waveform; calculating a time difference between the trailing edge of each said feature and a nearest one of said positive edges of the clock waveform; and calculating a time difference between the trailing edge of each said feature and a nearest one of said negative edges of the clock waveform.

24. The method of claim 23, further comprising the step of storing each of the calculated time differences for each feature in the respective feature buffer.

25. The method of claim 17, further comprising the steps of receiving a known clock period, said waveform encoded as said features having respective widths varying as integer multiples of said known clock period; and categorizing each of said extracted features into one of a plurality of category groups, each of said category groups corresponding to a respective integer multiple of said known clock period.

26. The method of claim 25, further comprising the step of storing the categorization of each said feature in the respective feature buffer.

27. Method of identifying features in a waveform, comprising the steps of:
    extracting each feature in the waveform in accordance with a predetermined threshold level and a predetermined hysteresis level; and
    categorizing each of said extracted features into one of a plurality of category groups, each of said category groups corresponding to a respective integer multiple of said known clock period.

28. The method of claim 27, wherein each of said extracted features has a respective width; and said step of categorizing is carried out by ascertaining, for each of said extracted features, one of a plurality of ideal widths to which the width of the respective feature is closest; and categorizing each of said extracted features into said one of said plurality of category groups corresponding to the respective ascertained ideal width.

29. The method of claim 28, wherein each of said ideal widths has a value equal to a respective integer multiple of said known clock period.

30. The method of claim 27, wherein said step of categorizing is carried out by ascertaining, for each of said extracted features, an integer value n of the respective feature satisfying the equation $(n-0.5)T \leq w < (n+0.5)T$, wherein w represents the width of the respective feature, T represents the known clock period, and said integer value n corresponds to one of said plurality of category groups.

31. The method of claim 27, wherein said step of extracting includes the step of identifying a polarity of each feature; and said step of categorizing is carried out by categorizing each of said extracted features by the respective polarity and by the respective category group.

32. The method of claim 27, further comprising the steps of identifying a data type to be displayed and a desired category group; processing data pertaining to each of the features categorized into said desired category group to derive categorization data; and displaying said categorization data, said categorization data pertaining to the desired category group.

33. The method of claim 27, wherein said step of categorizing is carried out by categorizing each of said extracted features by the respective polarity and by the respective category group; said method further comprising the step of identifying a desired polarity; and wherein said step of processing data is carried out by processing data pertaining to each of the features categorized into said desired category group and having the desired polarity.

34. The method of claim 27, further comprising the steps of identifying a data type to be displayed and a desired plurality of said category groups; processing data pertaining to each of the features categorized into any one of said plurality of desired category groups to derive categorization data; and displaying said categorization data.

35. The method of claim 27, further comprising the steps of identifying a data type to be displayed and desired discrete ones of said category groups; processing data pertaining to each of the features categorized into each of said desired discrete ones of said category groups to derive respective categorization data, each said respective categorization data pertaining to a respective desired one of said category groups; and displaying simultaneously the respective categorization data.

36. Method of producing desired data regarding at least one feature of an optical recording waveform, comprising the steps of:
    identifying a type of data necessary to produce a desired data regarding at least one feature of an optical recording waveform;
    identifying one of a plurality of functions providing said type of data, each of said plurality of functions deriving respective feature data from respective dependent data;
    determining if at least one of said dependent data of the identified function is the feature data derived by another of said functions;
    performing, if said at least one of said dependent data of the identified function is determined to be feature data derived by said another of said functions and if said another of said functions was not performed previously, said another of said functions to derive said at least one of said dependent data;
    performing, if the identified function was not performed previously, the identified function to derive the respective feature data; and
    producing said desired data from the derived respective feature data of the identified function.

37. The method of claim 36, wherein one of said functions is an extract function, said extract function deriving position information of each feature of the optical recording waveform from the optical recording waveform, a threshold level and a hysteresis level.

38. The method of claim 37, wherein another of said functions is an amplitude function, said amplitude function deriving amplitude information of each feature of the optical recording waveform from the optical recording waveform and from the position information derived from the extract function.

39. The method of claim 37, wherein another of said functions is a clock function, said clock function deriving clock edge information of each feature of the optical recording waveform from the position information derived from the extract function and from a clock waveform.

40. The method of claim 37, wherein another of said functions is a categorize function, said categorize function deriving a category grouping of each feature from the position information derived from the extract function and from a known clock period.

41. The method of claim 36, wherein said step of performing the identified function is carried out by performing the identified function if the identified function was not performed previously or if the respective dependent data of the identified function was modified after a previous performance of the identified function.

42. The method of claim 36, wherein said step of performing said another of said functions is carried out if said another of said functions was not performed previously or if the respective dependent data of said another of said functions was modified after a previous performance of said another of said functions.

43. The method of claim 36, wherein said step of identifying a type of data is carried out by identifying the type of data necessary to produce desired statistical data regarding a selected category grouping of the features of the optical recording waveform; said method further comprising the step of performing a categorize function to derive said category grouping of each said feature; and wherein said step of producing said desired data is carried out by supplying the derived feature data of only said features having said selected category grouping and by producing the desired statistical data from the supplied feature data.

44. Method of identifying a base\top of a feature in a waveform, comprising the steps of:

receiving a waveform representing optically recorded data, said waveform including at least one feature having a plurality of levels;

identifying a most often occurring one of said plurality of levels of one of said at least one feature as a most likely level; and producing the base\top of said one of said at least one feature from those levels of said one of said at least one feature at or exceeding the most likely level.

45. The method of claim 44, wherein said step of identifying is carried out by histograming all of the levels of said one of said at least one feature to produce a histogram having a plurality of levels; identifying a most intensely populated region of the histogram; and identifying a level of the histogram corresponding to the identified most intensely populated region as the most likely level.

46. The method of claim 44, wherein the step of producing the base\top is carried out by averaging all of the levels of said one of said at least one feature having a magnitude at or above a magnitude of the most likely level to produce the base\top.

47. The method of claim 44, wherein said one of said at least one feature is a pit of the received waveform and said step of averaging is carried out by produce the top of the pit.

48. The method of claim 44, wherein said one of said at least one feature is a space of the received waveform and said step of averaging is carried out by produce the bottom of the space.

49. The method claim 44, further comprising the step of extracting said one of said at least one feature in the waveform in accordance with a predetermined threshold level and a predetermined hysteresis level.

* * * * *